United States Patent [19]
Moriya

[11] Patent Number: 6,085,219
[45] Date of Patent: Jul. 4, 2000

[54] HOME PAGE CREATING SYSTEMS APPARATUSES AND PROGRAM RECORDING MEDIUMS, AND HOME PAGE DISPLAYING SYSTEMS AND PROGRAM RECORDING MEDIUMS

[75] Inventor: Koji Moriya, Higashiyamato, Japan

[73] Assignee: Casio Computer Co., Ltd., Tokyo, Japan

[21] Appl. No.: 09/039,886

[22] Filed: Mar. 16, 1998

[30] Foreign Application Priority Data

Mar. 24, 1997 [JP] Japan .................................... 9-087315

[51] Int. Cl.[7] .............................. G06F 13/38; G06F 15/17
[52] U.S. Cl. ........................ 709/200; 709/203; 709/217; 709/223
[58] Field of Search .................................... 709/203, 217, 709/223, 200

[56] References Cited

U.S. PATENT DOCUMENTS

| | | | |
|---|---|---|---|
| 5,649,186 | 7/1997 | Ferguson | 709/203 |
| 5,721,908 | 2/1998 | Lagarde et al. | 709/217 |
| 5,761,663 | 6/1998 | Lagarde et al. | 709/217 |
| 5,778,367 | 7/1998 | Wesinger, Jr. et al. | 709/217 |
| 5,790,664 | 8/1998 | Coley et al. | 709/223 |
| 5,812,776 | 9/1998 | Gifford | 709/217 |
| 5,890,170 | 3/1999 | Sidana | 709/217 |

*Primary Examiner*—Frank J. Asta
*Assistant Examiner*—Farzaneh Farahi
*Attorney, Agent, or Firm*—Frishauf, Holtz, Goodman, Langer & Chick, P.C.

[57] ABSTRACT

A home page creating system, apparatus, and program recording medium, capable of creating a home page easily without requiring any special knowledge, wherein, when a WWW server confirms a terminal's request to create a home page, the terminal's type code is set in a predetermined register based on the terminal's ID. The server sends terminal user's preference inquiry data to the terminal and receives user's preference data entered from the terminal by the user. When the server receives all user's preference data about predetermined items, it creates a home page by pasting information corresponding to the user's preference data to a predetermined template. The created home page is stored along with data on the date and time when the home page was created in a predetermined data file, and is then sent to the terminal.

19 Claims, 11 Drawing Sheets

FIG.4

| TYPE | AGE GROUP | TEMPLATE |
|---|---|---|
| PC (PERSONAL COMPUTER) | 10 | |
| | 20 | |
| | 30 | |
| | 40~ | |
| DEDICATED TERMINAL | 10 | |
| | 20 | |
| | 30 | |
| | 40~ | |

| | NEWS | INTEREST | AREA | SHOPPING | DIVINING | |
|---|---|---|---|---|---|---|
| 10 | × | ○ | × | × | ○ | |
| 20 | ○ | ○ | × | ○ | ○ | |
| 30 | ○ | ○ | ○ | ○ | × | |
| 40~ | ○ | ○ | ○ | ○ | × | |

27b

FIG.6
| | DESTINATION TO BE LINKED | KEYWORD |
|---|---|---|
| NEWS | http://www.···· | ○○(NEWS PAPER) |
| | http://www.···· | ××(NEWS PAPER) |
| | ⋮ | ⋮ |
| INTEREST | http://www.···· | READING |
| | http://www.···· | READING |
| | http://www.···· | MOVIE |
| | ⋮ | ⋮ |
27c
FIG.7
| FACE IMAGE | PROFESSIONAL ENTERTAINER'S NAME |
|---|---|
|  | Mr. A |
|  | Mr. B<br>Mr. C |
27d

HOME PAGE CREATING SYSTEMS APPARATUSES AND PROGRAM RECORDING MEDIUMS, AND HOME PAGE DISPLAYING SYSTEMS AND PROGRAM RECORDING MEDIUMS

BACKGROUND OF THE INVENTION (1) Filed of the Invention

The present invention relates to home page creating systems, apparatuses and program recording mediums, and home page displaying systems and program recording mediums.

(2) Description of the Prior Art

At present, various home pages are open on the Internet. A user of a personal computer contracts with a service provider for receiving a home page on the Internet to obtain various information from all over the world. By opening one's home page on a server which a service provider possesses, the user is able to use the home page as means for generating information.

The home page must usually be created by the one who opens a home page. Thus, a large amount of application software to create home pages is being sold.

Even when a user creates a home page using such application software, he/she must have some special knowledge. Therefore, it takes a large amount of time for an individual to create the home page. You can leave the creation of a home page to a home page creating company, but this, however, is relatively expensive.

The range of a home page which each individual accesses is generally limited. Therefore, the same person can successively access the same home page. In this case, however, the same home page is sent to the person's terminal from a server placed in the service provider each time the person accesses that home page. Thus, it takes some time from the time when the terminal requested transmission of the same home page to the time when the terminal receives the home page.

It is a first object of the present invention to provide a home page creating system, method and apparatus capable of creating a home page easily without requiring any special knowledge.

It is a second object of the present invention to provide a home page displaying system capable of reducing the time required for sending a home page.

SUMMARY OF THE INVENTION

The features of the present invention are clarified by a home page creating system which includes a client and a server which is connected via a commutation line to the client, the client requesting the server to create a home page,
the client comprising:
a home page creating request sending means for sending the server a request to create the home page;
an inquiry data receiving means for receiving inquiry data to create the home page and sent by the server in reply to the request to create the home page;
an answer data inputting means for providing answer data to the inquiry data received by the inquiry data receiving means; and
an answer data sending means for sending the server the answer data provided by the answer data inputting means, the server comprising:
a home page creating request receiving means for receiving the request to create the home page sent by the home page creating request sending means;
an inquiry data sending means for sending the inquiry data receiving means the inquiry data in reply to the request to create the home page received by the home page creating request receiving means;
an answer data receiving means for receiving the answer data sent by the answer data sending means;
a home page creating means for creating the home page based on the answer data received by the answer data receiving means; and
a storing means for storing the home page created by the home page creating means.

Thus, according to the inventive home page creating system, the home page creating means creates a home page automatically based on the answer data. Thus, anybody can easily create a home page without any special knowledge.

The present invention also provides a home page displaying system which comprises a server which in turn comprises a first home page storage means which contains a home page along with update information indicative of the updated state of the home page, and a client which accesses the server to request the server to send the client the home page and update information stored in the first home page storage means,
the client comprising:
a first home page receiving means for receiving the home page and updated information sent first by the server;
a second home page storing means for storing the home page and updated information received by the first home page receiving means;
an updated information sending means for sending the server the updated information stored in the second home page storing means when the client accesses the server at or after a second time;
a coincidence information receiving means for receiving coincidence information sent by the server when the home pages stored in the first and second home page storing means coincide;
a second home page receiving means for receiving a home page sent by the server when the home pages stored in the first and second home page storing means do not coincide; and
a displaying means, responsive to the coincidence information receiving means receiving the coincidence information, for displaying the home page stored in the second home page storing means, and responsive to the second home page receiving means receiving the home page, for displaying the home page received by the second home page receiving means, the server comprising:
a first home page sending means, responsive to first access by the client, for sending the client the home page and updated information stored in the first home page storing means;
an updated information receiving means for receiving the updated information sent by the updated information sending means of the client;
a comparing means for determining whether the updated information received by the updated information receiving means coincides with the updated information stored in the first home page storing means;

a coincidence information sending means, responsive to the comparing means determining that the updated information received by the updated information receiving means coincides with the updated information stored in the first home page storing means, for sending the coincidence information sending means the compared coinciding information; and a second home page sending means, responsive to the comparing means determining that the updated information received by the updated information receiving means does not coincide with the updated information stored in the first home page storing means, for sending the second home page receiving means the home page stored in the first home page storing means.

Thus, according to the inventive home page displaying system, the comparing means determines based on the updated information whether the content of the home page stored in the first home page storing means coincides with that stored in the second home page storing means. If so, the home page stored in the second storage means of the client is only required to be displayed, and hence the time required for sending the home page is reduced.

BRIEF DESCRIPTION OF THE DRAWING

FIG. 4 Illustrates a template selection table in the embodiment;

FIG. 5 illustrates a preference inquiry data table in the embodiment;

FIG. 6 illustrates a linked destination address table used in the embodiment;

FIG. 7 illustrates a face image table in the embodiment;

DESCRIPTION OF THE PREFERRED EMBODIMENT

Referring to the accompanying drawings, the embodiment of the present invention will be next described.

Figure 1:
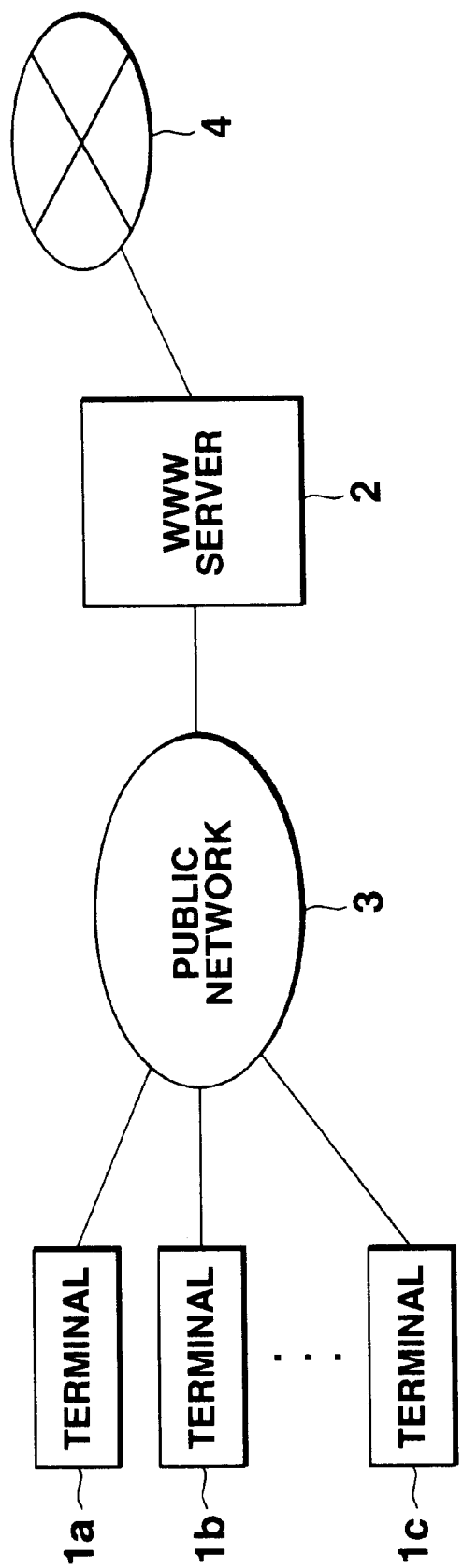
FIG. 1 illustrates the composition of a network system to which a home page creating system as an embodiment of the present invention is applied.

FIG. 1 Illustrates a composition of a network system to which the home page creating system as the embodiment of the present invention is applied.

As shown, this network system is composed of terminals 1a–1c and a WWW server 2 connected via a public network 3, and an Internet 4 connected to the WWW server 2.

The terminals 1a–1c are each composed of a personal computer or a portable information terminal. The terminals 1a–1c are each a client which receives service from the WWW server 2 and creates a home page, using the function of the WWW server 2, as will be described later. The personal computers and portable information terminals as the terminals 1a–1c are allocated respective type codes. The composition of the terminals 1a–1c will be described in detail later.

The WWW server 2 is placed in a service provider which provides WWW services and opens a home page, accesses another service provider interconnected by the Internet 4, and performs other processes. The composition of the WWW server 2 will be described in detail later.

The public network 3 includes communication lines such as telephone lines/ISDN lines provided by a telecommunication company.

The Internet 4 includes a plurality of Internet computer networks (LANs/WANs) interconnected to each other. The Internet 4 has many service providers similar to the service providers in which the respective WWW servers 2 are placed.

In the network system, the users of the terminals 1a–1c have for predetermined matters contracted with the service provider in which the WWW server 2 is placed. In the contraction, the users of the terminals 1a–1c have entered in the service provider basic data such as the respective users' names, sexes, ages, and terminal IDs and types.

Figure 2:
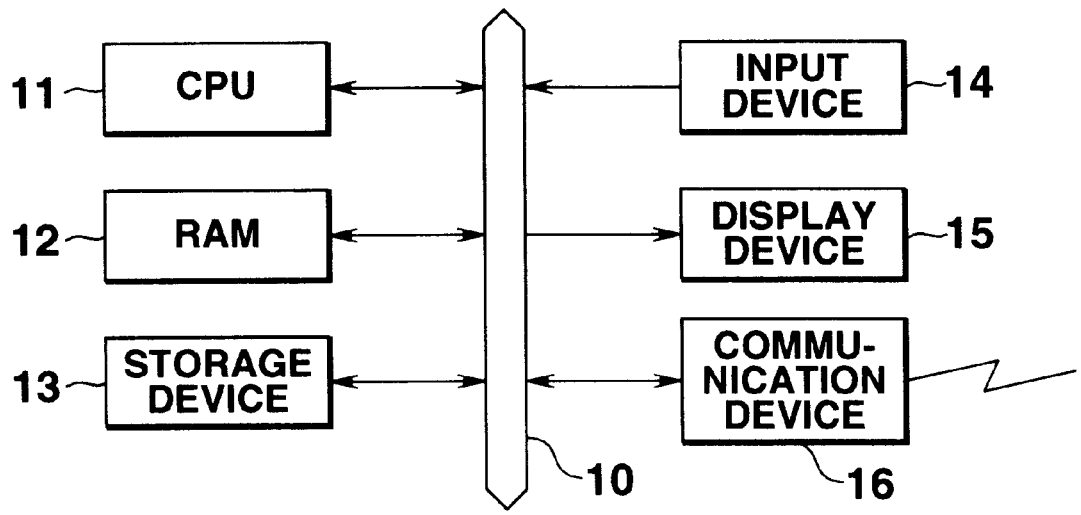
FIG. 2 is a block diagram of a terminal in the network system of FIG. 1.

FIG. 2 is a block diagram of each of the terminals 1a–1c in the network system of FIG. 1. As shown, the terminal 1a–1c are each composed of a CPU 1, a RAM 12, a storage device 13, an input device 14, a display device 15 and a communication device 15 which are connected to a bus 10.

Figure 9:
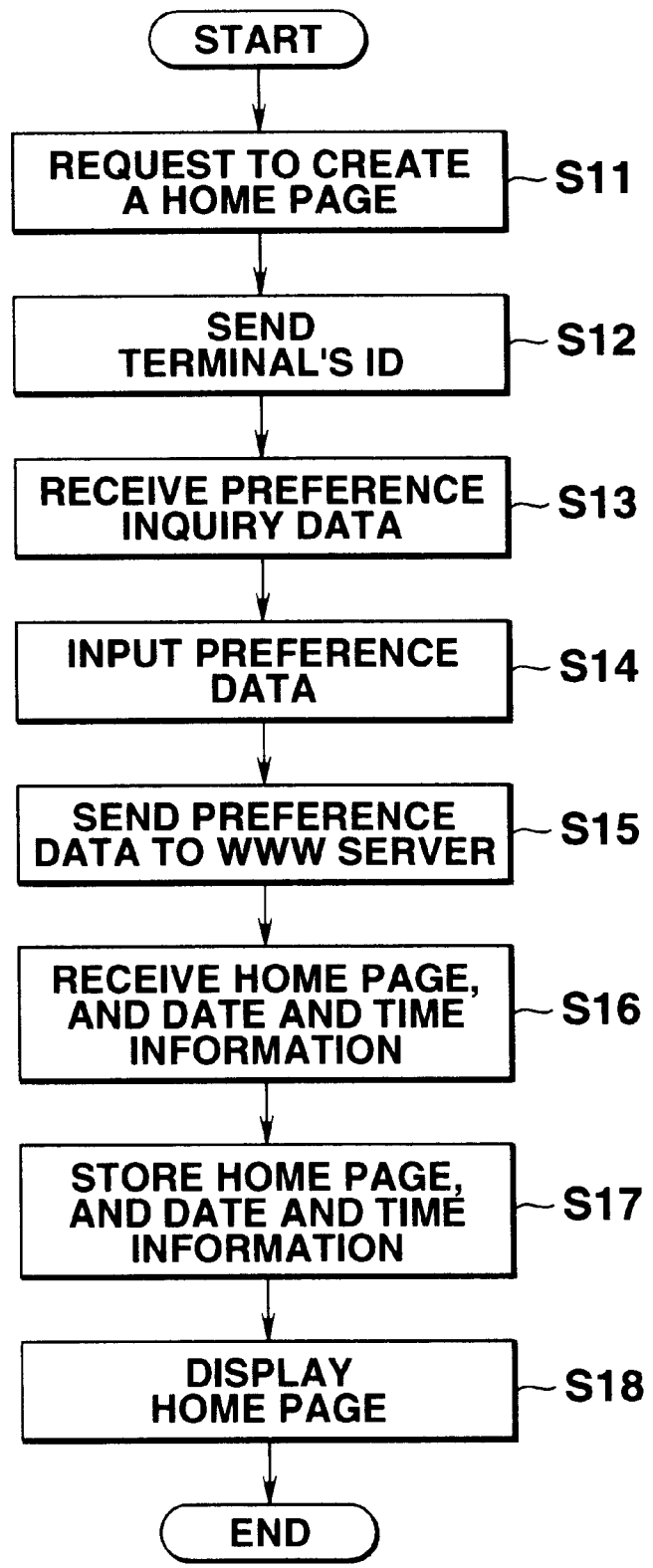
FIG. 9 is a flow chart of a home page creating process performed by the terminal.
Figure 12:
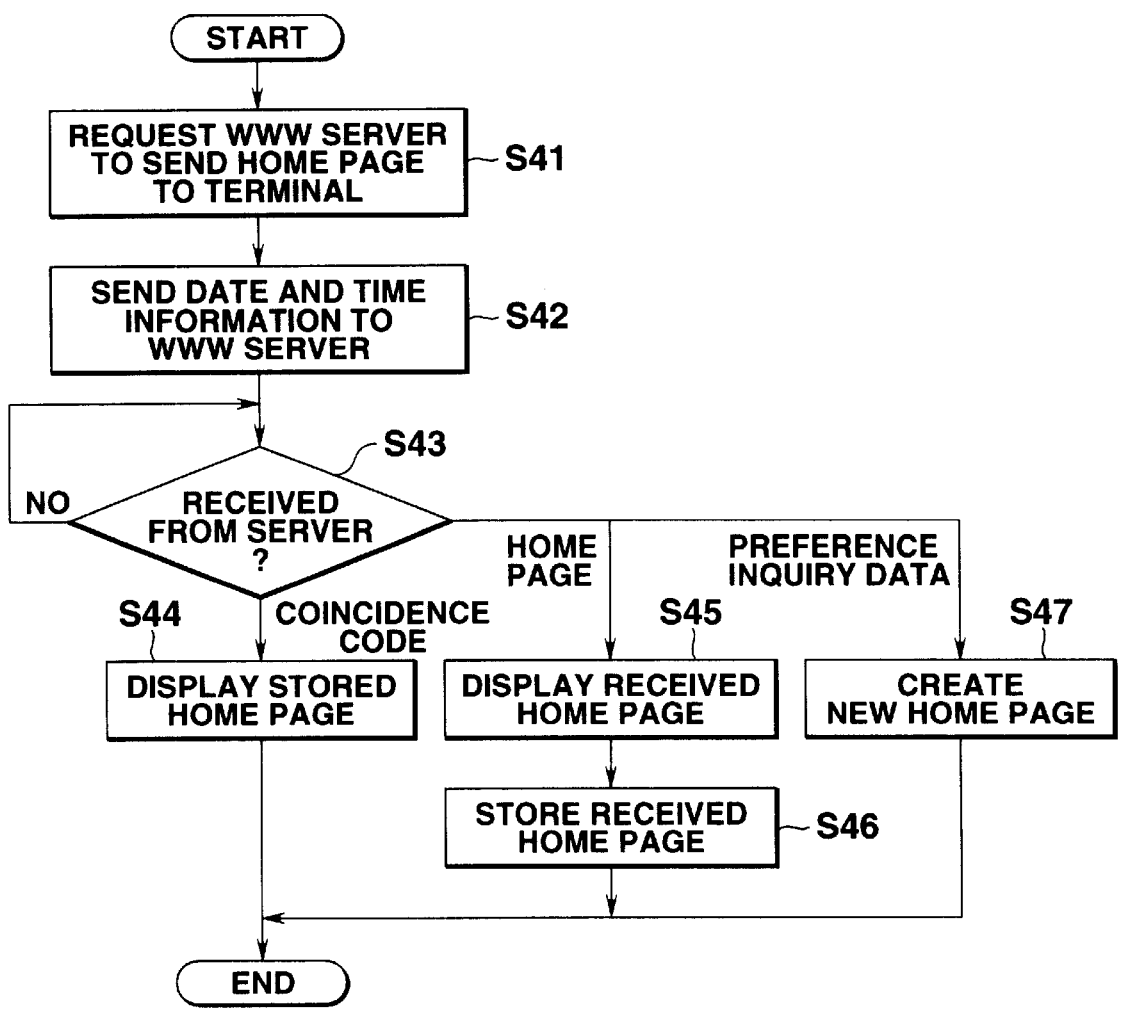
FIG. 12 is a flow chart of a home page displaying process performed by the terminal.
Figure 14:
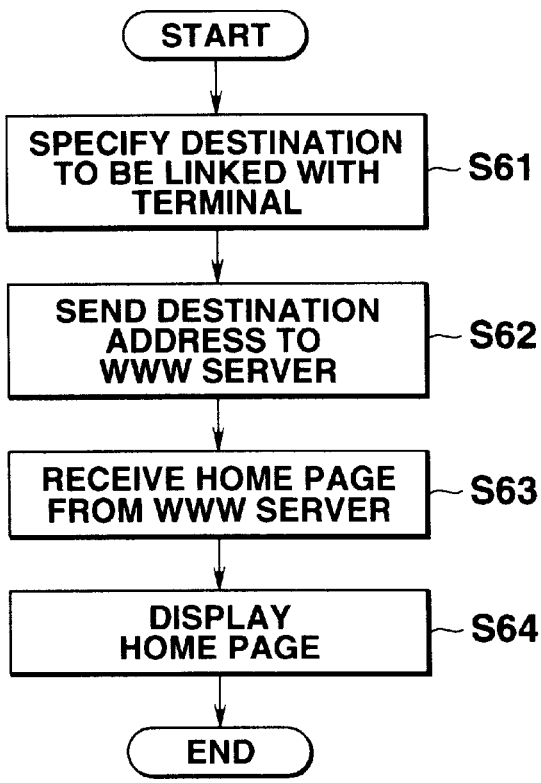
FIG. 14 is a flow chart of a linked destination accessing process performed by the terminal.

CPU 11 reads out respective programs shown in the flow charts of FIG. 9, 12 and 14 and other programs from the storage device 13 to RAM 12, and then executes the respective programs. CPU 11 controls the respective elements of each of the terminals 1a–1c. CPU 11 is provided with a plurality of general-purpose registers to execute the respective programs.

RAM 12 is composed of a semiconductor memory used as a main storage area of CPU 11 and has a work memory on which the respective programs are loaded.

The storage device 13 is composed of a recording medium such as a magnetic disc device which stores programs to control the CPU 11.

The input device 14 is composed of a keyboard/mouse. The user of each terminal 1a–1c enters via the input device 14 the users' preference data which is answer data to the users' preference inquiry data, and other data to be described later. The input device 14 is also used to enter commands to instruct CPU 11 to execute predetermined processing programs.

The display devise 15 is composed of a CRT (Cathode Ray Tube) or a liquid crystal display device which displays the results of the processing by CPU 11 or a home page sent from the WWW server 2 by a process to be described later.

The communication device 16 is provided with a line terminating device such as a modem and physically connects a communication line therefrom to the WWW server 2 to control transmission of data.

Figure 3:
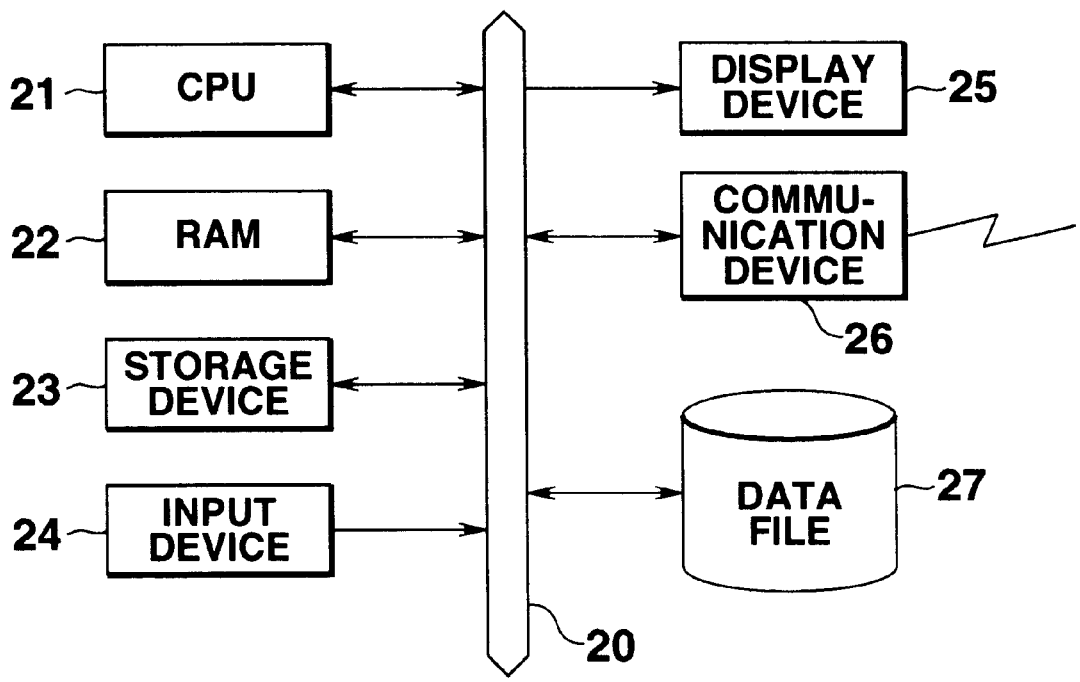
FIG. 3 is a block diagram of a WWW server in the network system of FIG. 1.

FIG. 3 is a block diagram of the WWW server 2 in the network system of FIG. 1. As shown, the WWW server 2 is composed of a CPU 21, a RAM 22, a storage device 23, an input device 24, a display device 25, a communication device 26, and a data file 26, each connected to a bus 20.

CPU 21 reads out from the storage device 23 to RAM 22 programs shown by the flow charts of FIGS. 10, 11, 13 and 15 and other programs to be described later, and executes the respective programs. CPU 21 controls the respective components of the WWW server 2.

CPU 21 is also provided with a plurality of general-purpose registers and an internal timer. The internal timer measure an elapsed time and records the present date and time, which when a home page is created, are stored along with the home page in the storage device 23. The home page and the value of the internal timer are sent together to the respective terminals 1a–1c.

RAM 22 is composed of a semiconductor memory which is used as a main storage area of CPU 21 or a work memory on which the respective programs are loaded.

The storage device 23 is composed of a recording medium such as a magnetic disc device which contains a processing program for CPU 21.

The input device 24 is composed, for example, of a keyboard. By manipulating the input device 24, the operator is able to enter predetermined data and gives a predetermined command to CPU 21.

The display device 25 is composed of a CRT which displays for the operator a result of processing by CPU 21.

The communication device 26 is provided with a line terminating device such as a modem and physically connects a communication line between the terminals 1a–1c to control data transmission. The communication device 26 also connects a communication line between the communication device 26 and another WWW server on the Internet 4 to control transmission of data to/from that WWW server.

The data file 27 stores the respective home pages of the u 2rs at the terminals 1a–1c created by a process to be described later, the times required for creating the respective home pages and information used to create those home pages.

The data file 27 contains, as information for creating a home page, the user's basic data for which the user has contracted with a service provider concerned, a template selection table 27a, a preference inquiry data table 27b, a linked destination address table 27c, and a face image table 27d.

As shown in FIG. 4, the template selection table 27a contains templates to create corresponding home pages (or addresses where the respective templates are stored) and corresponding user age groups for each of types of the terminals 1a–1c. A template to create a home page is selected for each of the types of the terminals and a user age group, and information based on user's preference data which is answer data to preference inquiry data to be described later is pasted to the template.

As shown FIG. 5, the preference inquiry table 27b shows for each of the user age groups whether user's respective preference data items should be inquired. In an example of FIG. 5, O shows that a corresponding item should be inquired while an item shown by X should not be inquired. When any one of the terminals 1a–1c requests the WWW server 2 to create a home page, the WWW server 2 creates preference inquiry data based on the preference inquired table 27b.

As shown FIG. 6, the linked destination address table 27c contains collected linked destination addresses with which other home pages are accessed in accordance with preference data which are answer data to the respective preference inquiry data. In an example of FIG. 6, when preference data shown by a keyword is obtained for each of items of the preference inquiry data, the corresponding linked destination address is pasted to the relevant template.

As shown FIG. 7, the face image table 27 is provided to paste a predetermined face image to the template, for example, in accordance with the name of a professional entertainer whom the user resembles, obtained in the preference data. As shown FIG. 7, the relationship between the face images and the entertainers' names may be one-to-one or one against many.

Figure 8A:
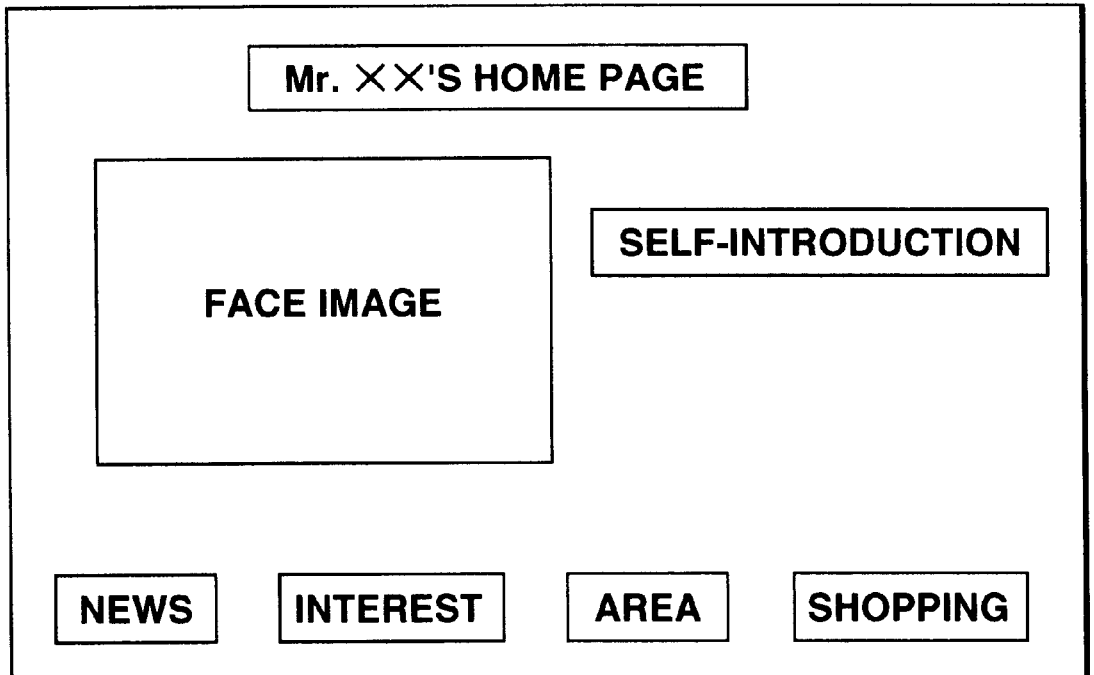
FIGS. 8A and 8B illustrate a displayed home page created by the home page creating system of the embodiment.
Figure 8B:
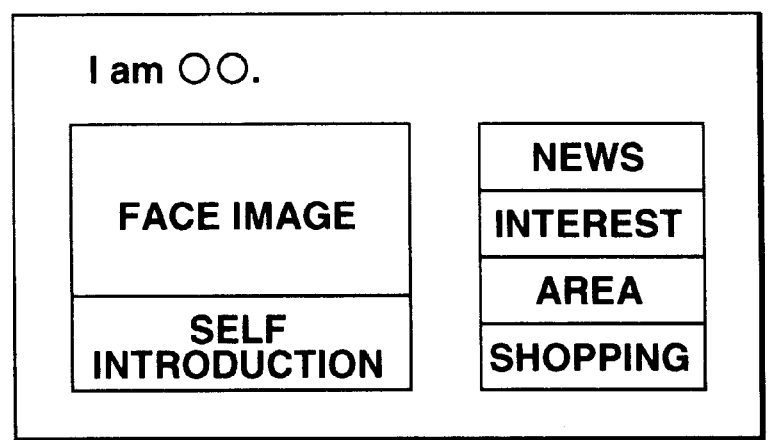

FIGS. 8A and B show displayed examples of home pages created in this embodiment. FIG. 8A shows a displayed example of a created home page 28 obtained when the terminal is a personal computer. FIG. 8B shows a displayed example of a created home page 29 obtained when the terminal is a portable information terminal.

By displaying those home pages on the display device 15, moving a cursor of a mouse as the input device 14 to any one of item boxes such as news, interest, area and shopping on the displayed device 15, and then clicking the mouse, the user is able to refer to a destination address to be linked from the displayed home page. When as a person other than the user of the terminal which created the home page accesses the home page, the person is able to know information on the user who opened the home page, by moving the mouse cursor to a self introduction box and clicking the mouse button.

A home page creating process in this embodiment will be described next on condition that the terminal 1a requests the WWW server 2 to create a home page.

Figure 10:
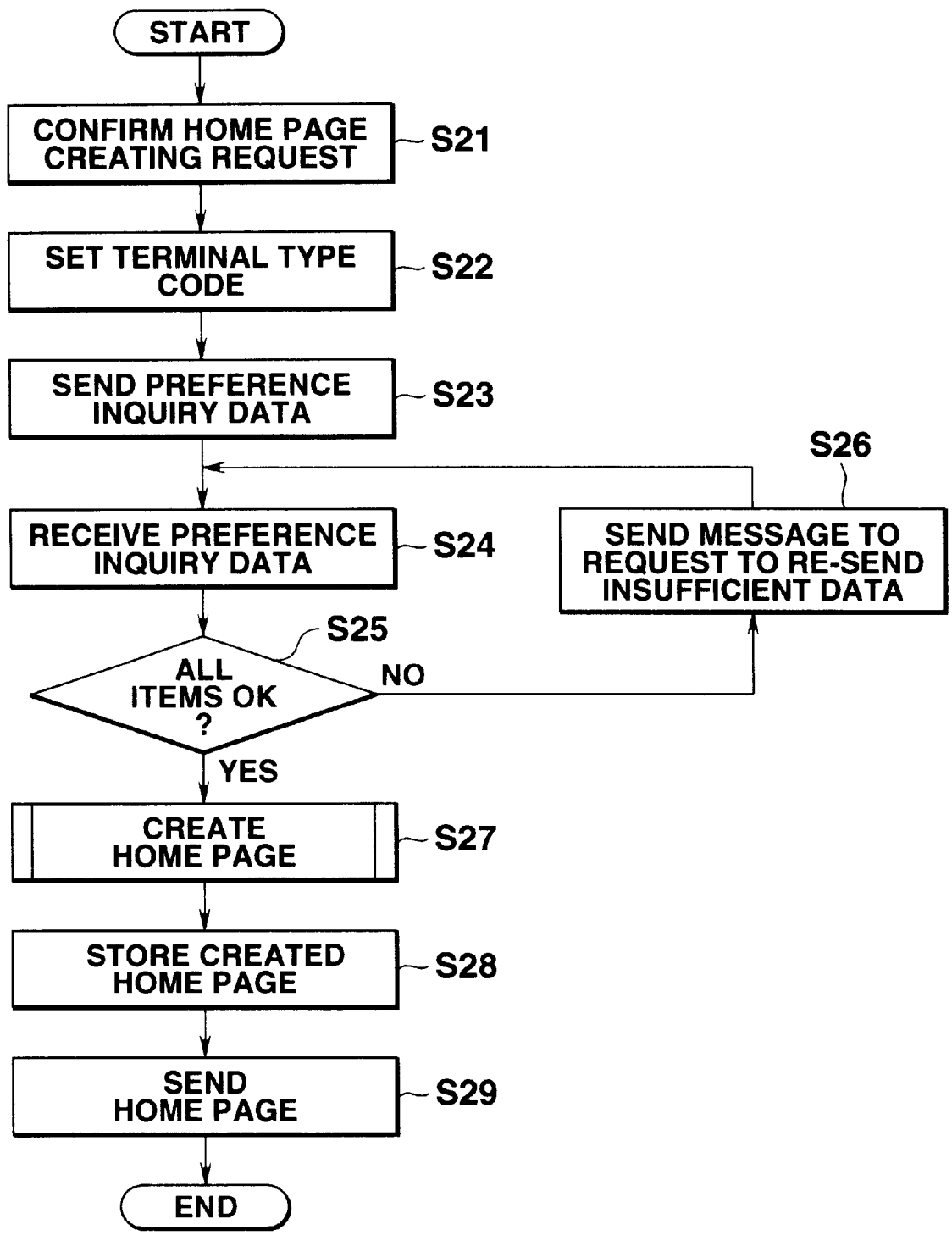
FIG. 10 is a flow chart of a home page creating process performed by the WWW server.

FIG. 9 shows a flow chart of a part of the home page creating process performed by the terminal 1a in this embodiment. FIG. 10 shows a flow chart of a part of the home page creating process performed by the WWW server 2. Those flow charts are advanced in a dialog type cooperative manner.

The programs which realize the respective processes described in those flow charts of FIGS. 9 and 10 are recorded in recording mediums of the storage device 13 and 23 in the form of a program code which the CPUs 11 and 21 are able to read. The data read by the CPU 11 or 21 is loaded on the work memory of the RAM 12 or 22.

This applies likewise to other flow charts of FIGS. 11–15 to be described later.

When the user of the terminal 1a depresses a predetermined key of the input device 14 to instruct the terminal 1a to create a home page, a data link is established and hence a communication line is connected between the communication device 16 of the terminal 1a and the communication device 26 of the WWW server 2. This causes to start the flow charts of FIGS. 9 and 10.

Then, the terminal 1a sends a home page creating request to the WWW server 2 (S11). The terminal 1a then sends an ID of the terminal 1a to the WWW service 2 (S12).

As shown in FIG. 10, the WWW server 2 first receives the home page creating request from the terminal 1a at step S11 of FIG. 9 and confirms it (S21). The WWW server 2 then receives the terminal ID sent from the terminal 1a at s tep S12 and sets a corresponding terminal type code in a predetermined general-purpose register of the CPU 21 (S22). The WWW server 2 then reads out the user's basic data from the ID of the terminal 1a, and creates preference inquiry data by referring to the preference inquiry table 27b, and then sends the terminal 1a the created preference inquiry data (S23).

In FIG. 9, the terminal 1a receives the preference inquiry data sent by the WWW server 2 (S13). The received preference inquiry data is subjected to predetermined processing by CPU 11 and then displayed on the displayed device 15. The user of the terminal 1a views the preference inquiry data displayed on the display device 15 and then inputs from the input device 14 preference data as answer data to the preference inquiry data (S14). Then, when the user of the terminal 1a inputs predetermined data from the input device 14, the terminal 1a sends the WWW server 2 the preference data inputted at step S14 (S15).

In FIG. 10, the WWW server 2 receives preference data sent by the terminal 1a at step S15 of FIG. 9 (S24). The WWW server 2 then determines whether all the item data are contained in the received preference data (S25).

When the WWW server 2 determines at the step S25 that all the item data are not contained in the received preference data, it sends the terminal 1a a message to request the terminal to re-input and send the insufficient data (S26). In this case, the terminal 1a displays on the display device 15 a massage which requests the terminal to re-input and send the insufficient data (not shown), and again performs processing at steps S14 and S15 to re-input and send the insufficient preference data to the WWW server 2.

When the WWW server 2 determines at step S25 that all the item data are contained, it creates a home page based on the preference data received at step S24 (S27).

Figure 11:
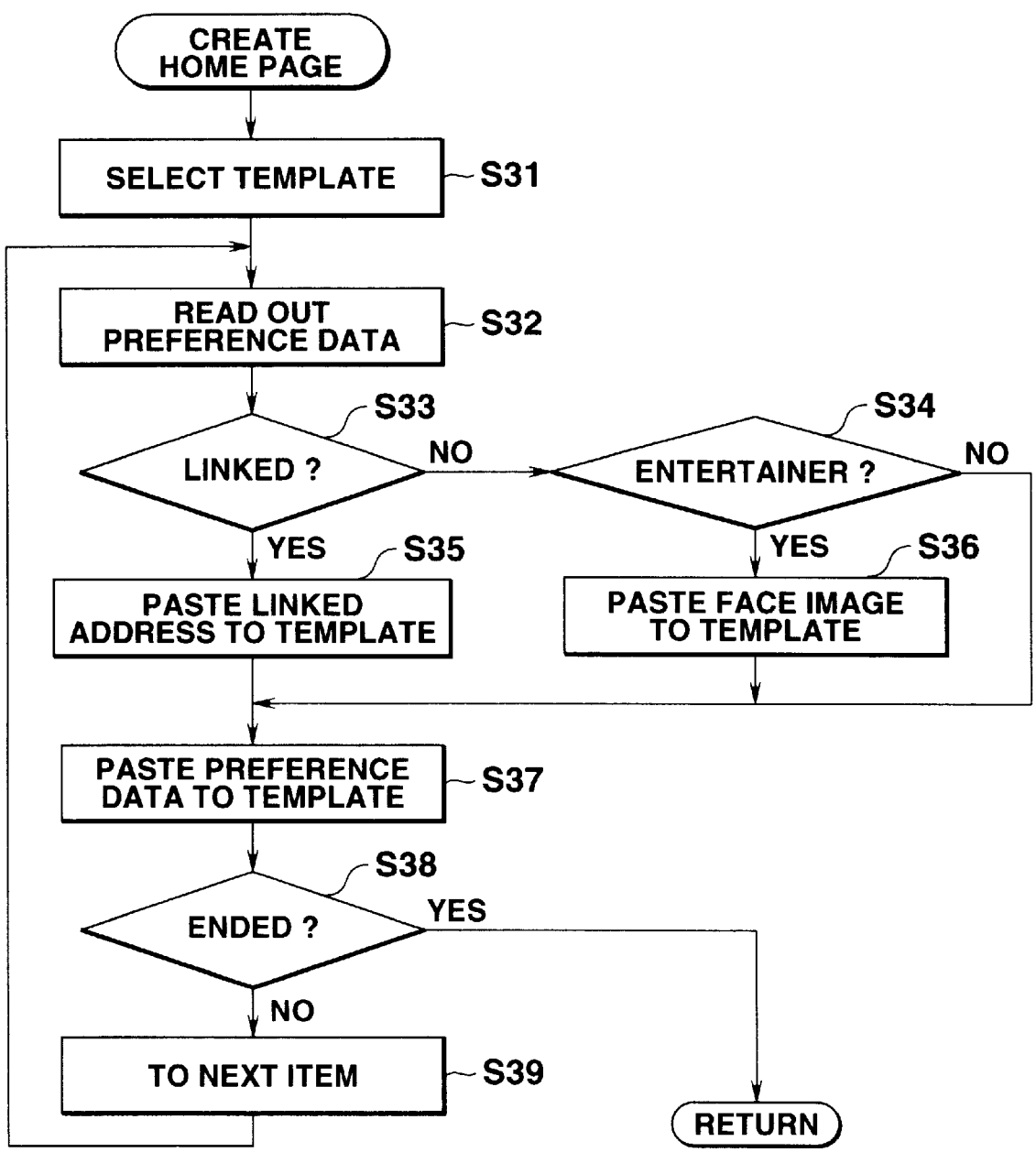
FIG. 11 is a flow chart of a home page creation subroutine of the flow chart of FIG. 10.

FIG. 11 shows the details of a sub-routine to create the home page at step S27. In FIG. 11, first, the WWW server 2 refers to the template selection table 27a on the basis of the terminal type code and user's age of the basic data set in the register at step S22 of FIG. 10 and selects a template appropriate for creating a home page (S31).

The WWW server 2 then sequentially reads out the preference data received at step S24 of FIG. 10, starting with its head item (S32). The WWW server then refers to the linked destination address table to determine whether there is an address of a home page to be linked for the preference data for the read item (S33). When the WWW server 2 determines that there is no address of the home page to be linked, it determines whether the preference data for the read item is that of a professional entertainer whom the user resembles (S34).

When the WWW server determines that there is an address of a home page to be linked at step S33, it pastes the address to a relevant template (S35).

When the WWW server 2 determines whether the preference data for the item read at step S34 is that of the entertainer whom the user resembles (S34), the WWW server refers to the face image table 27d of FIG. 7 and pastes a face image corresponding to that data to the template (S36).

When the WWW server determines that the preference data for the item read out at step S34 is not that of the entertainer whom the user resembles, or after the WWW server terminates the processing at step S35 or S36, it pastes the preference data to a column of self-introduction in the template (S37).

The WWW server 2 then determines whether the preference data for all the items have been pasted (S38).

If not, the WWW server then shifts its processing to preference data for the next item (S39) and repeats the processing, starting with the step S32.

When the WWW server determines that the preference data of all the items have been pasted at step S38, it terminates the processing of the sub-routine shown by the FIG. 11 flow chart, and then returns to the processing represented by the flow chart of FIG. 10.

The WWW serve 2 then stores in the storage device 23 the home page created by the above processing. At this time, the WWW server reads out the date and time indicated by the internal timer of CPU 21, and then stores its information along with the home page in the data file 27. The WWW server 2 then gives an appropriate address to the created home page and also stores this address likewise in the data file 27 (S28).

The WWW server 2 further sends the terminal 1a the home page and date and time information stored in the data file 27 (S29), and then terminates the processing represented by the flow chart of FIG. 10.

In FIG. 9, the terminal 1a receives the home page and date and time information sent by the WWW server 2 (S16). It then stores the home page and the date and time information in the storage device 13 (S17), displays the home page on the display device 15 (S18), and then terminates the processing indicated by the flow chart of FIG. 9.

A process for displaying the home page created in the above process, and more particularly, a process in which the terminal 1a accesses the home page created in the above process and displays the home page on the display device 15 will be described next.

Figure 13:
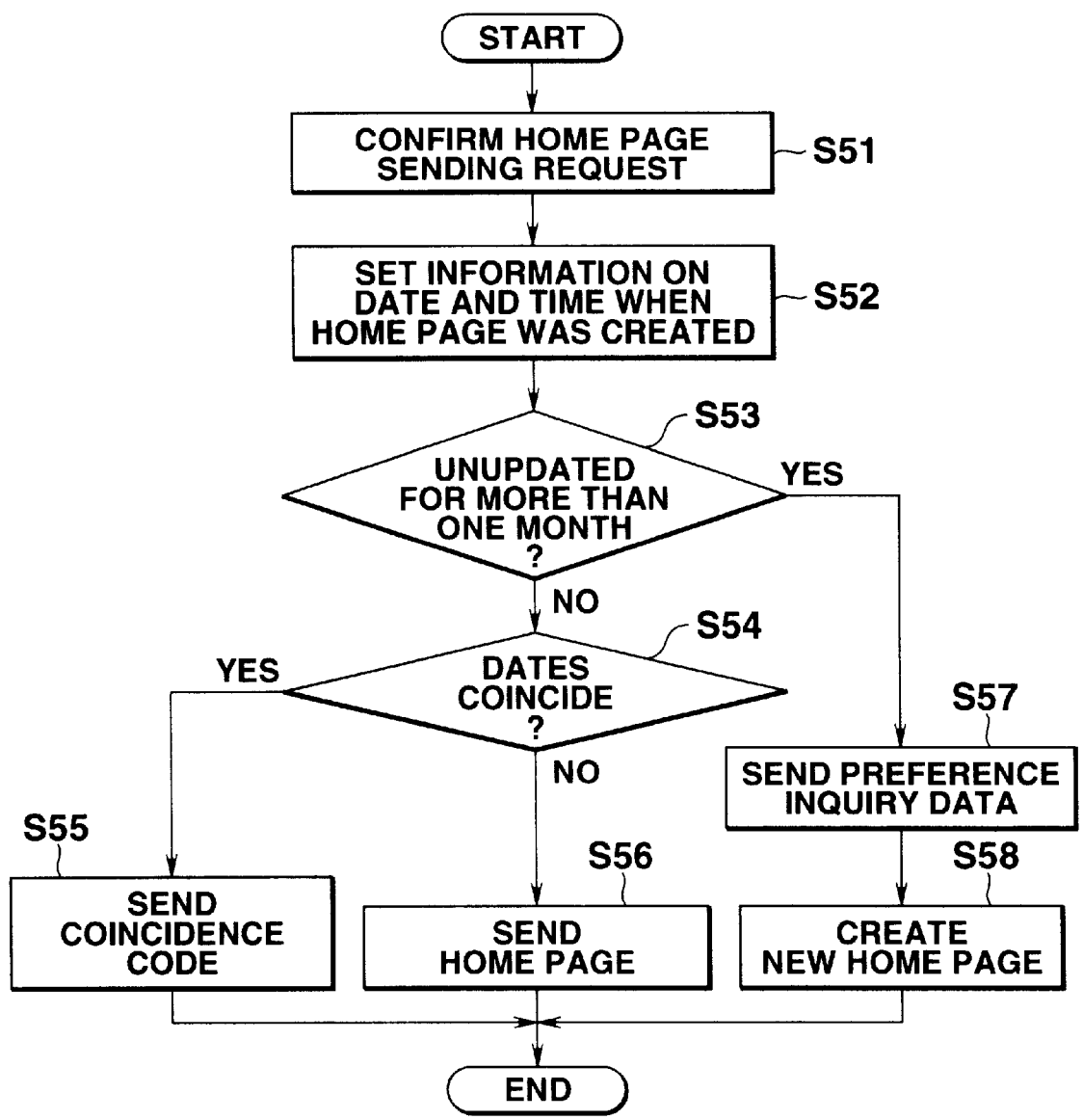
FIG. 13 is a flow chart of a home page sending process performed by the WWW server.

FIG. 12 is a flow chart of the home page displaying process performed by the terminal 1a. FIG. 13 is a flow chart of the home page sending process performed by the WWW server 2. Those flow charts cooperates to advance the processing.

First, when the user of the terminal 1a depresses a predetermined key of the input device 14 to instruct the terminal to send the home page, a data link is established between communication devices 16 and 26 to connect a communication line between the terminal 1a and the WWW server 2 to thereby start the flow chart processes of FIGS. 12 and 13.

Then, in FIG. 12, the terminal 1a sends the WWW server 2 a request to send the terminal the home page (S41). The terminal 1a then sends the WWW server 2 the date and time information stored in the storage device 13 (S42), and then waits for information incoming from the WWW server 2 (S43).

In FIG. 13, the WWW server 2 first receives and confirms the home page sending request sent by the terminal 1a at step S41 of FIG. 12 (S51). The WWW server 2 then receives the date and time information sent by the terminal 1a at step S42 of FIG. 12 and sets the date and time information in a predetermined general-purpose register of the CPU 21 (S52).

Then, the WWW server 2 reads out date and time information corresponding to the home page from the storage device 23, compares the date information with the value of the internal timer of the CPU 21 to determine whether the home page is stored unupdated for more than one month in the data file 27 (S53).

If not, the WWW server 2 compares the date and time information set at step S52 with the date and time information read out at step S53 (S54). If both the set and read date and time information coincide at step S54, the WWW server 2 then sends a predetermined coincidence code to the terminal 1a (S55).

When the comparison indicates non-coincidence at step S54, the WWW server 2 sends the terminal 1a the home page stored in the data file along with information on the date and time where the home page was created (S56).

When the WWW server 2 determines that the home page is stored unupdated for more than one month at step S53, the WWW server 2 refers to the preference inquiry data table 27b of the date file 27 and then sends the preference inquiry data to the terminal 1a (S57).

At step S43 of FIG. 12, the terminal 1a which has been waiting for incoming information from the WWW server 2 determines what the received information is or whether the received information is the coincidence code sent at step S55 of FIG. 13, the home page sent at step S56 or the preference inquiry data sent at step S57 (S43).

When the terminal 1a determines that the coincidence code has been received at step S43, the terminal 1a displays on the display device 15 the home page stored in the storage device 13 (S44), and then terminates the processing represented by the flow chart of FIG. 12.

When the terminal 1a determines that the home page has been received at step S43, the terminal 1a displays the received home page on the display device 15 (S45). The terminal 1a also writes the received home page and the date and time information over those corresponding information stored in the storage device 13 to update the data items stored in the storage device 13 (S46), and then terminates the processing represented by the flow chart of FIG. 12.

When the terminal 1a determines at step S43 that the preference inquiry data has been received, the terminal 1a and WWW server 2 cooperate to create a new home page. To this end, at step S47 of FIG. 12 the terminal 1a performs processing similar to that at steps S14–S18 (S47). At step 58 of FIG. 13 the WWW server 2 performs processing similar to that at steps S24–S29 of FIG. 10 (S58). When the new created home page is displayed on the display device 15 of the terminal 1a, the WWW server 2 and the terminal 1a terminate the processing represented by the flow charts of FIGS. 11 and 12, respectively.

The terminal 1a specifies an address of a destination to be linked from the home page displayed on the display device 15 in the home page creating process or in the home page sending process to access another home page on the Internet 4.

A process for accessing a destination to be linked in the embodiment will be described next.

Figure 15:
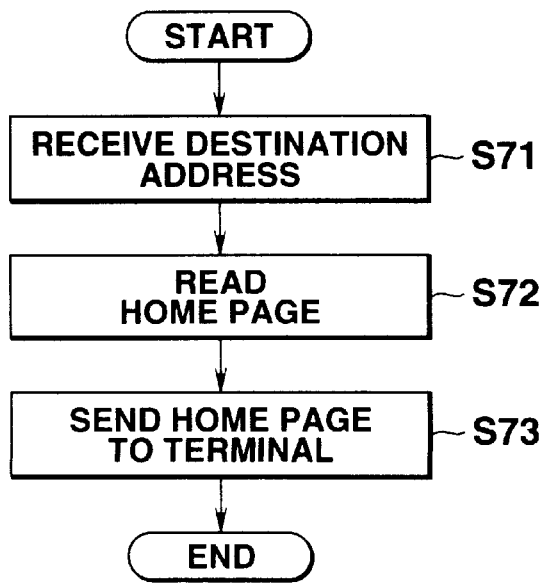
FIG. 15 is a flow chart of a liked destination accessing process performed by the WWW server.

FIG. 14 is a flow chart of processing performed by the terminal 1a to access the home page of the destination to be linked. FIG. 15 is a flow chart of processing performed by the WWW server 2 to access that home page. When the home page is displayed on the display device 15, those flow charts automatically start and cooperate with each other to advance the processing.

In FIG. 14, the user of the terminal 1a moves a cursor of a mouth of its input device 14, to a coordinate position of a predetermined box on the display device 15. When the user then clicks a mouth a bottom, an address of a destination to be linked with the displayed home page is displayed on the display device 15. When the user moves the mouth cursor to a desired address and then clicks the mouth button, the linked destination is specified (S61). Then, the terminal 1a sends the specified linked destination address to the WWW server 2 (S62).

In FIG. 15, the WWW server 2 then receives the linked destination address (S71). The WWW server 2 then accesses another home page indicated by the linked destination address on the Internet 4 and reads out the home page (S72). Then, the WWW server 2 sends the home page to the terminal 1a (S73) and then terminates the processing represented by the flow chart of FIG. 15.

The terminal 1a then receives the home page sent by the WWW serve 2 (S63), displays the home page on the display device 15 (S64), and then terminates the processing represented by the flow chart of FIG. 15.

When the user of the terminal 1a performs predetermined line-cutting operation at the input device 14, the input device instructs the communication device 16 to cut the communication line. Thus, the communication device 16 opens a data link between the communication device 16 and the communication device 26 of the server to thereby cut the communication line.

The home page created by the processing represented by the flow chart of FIGS. 9 and 10 is accessible from the terminal 1b, 1c and a terminal connected to another service provider on the Internet 4. This home page is displayed on the display device of the terminal which accessed the created home page by specifying its address.

By moving the mouth cursor to a coordinate position of a box of self-introduction on the displayed home page and clicking the mouth bottom, the third party can view information on the person who created the home page. Thus, the home page can be used to generate and send information.

As described above, in the embodiment, in reply to the preference inquiry data sent by the WWW server 2, the terminal 1a inputs and sends preference data to the WWW server. WWW server 2 receives this preference data to create a home page automatically. Thus, even a user who has no special expert knowledge, he/she can easily create a home page.

In the above embodiment, the template 27a to create a home page varies depending on a type of the terminal used. Thus, even a user who has a terminal rather than a personal computer can create a home page suitable for the terminal, using a relevant template.

In the above embodiment, the home page created by the WWW server 2 is stored in the storage device 13 of the terminal 1a. When a home page which the terminal 1a requested the WWW server 2 to send is the same as that stored in the storage device 13, the WWW server 2 sends only a coincidence code to the terminal. When the terminal 1a receives the coincidence code, it displays on the display device 15 the home page stored in the storage device 13. This reduces time required for sending the terminal the home page and hence also reduces a rental fee of the public network 3.

When in the above embodiment the WWW server 2 creates a home page, it records the date and time where the home page was created. When more than one month has elapsed from the date and time where the home page was created, the WWW server 2 creates a new home page. Thus, the user of the terminal 1a is able to update the home page at predetermined intervals of time without managing the time of updating the home page by himself/herself.

In the above embodiment, an address of another home page on the Internet 4 was linked with the created home page. The user of the terminal 1a can first access the users' home page and access another home page in accordance with the linked address. Since the linked address is based on the user's preference data, the user can obtain necessary information.

In the above embodiment, the processing performed between the terminal 1a and the WWW server 2 was described. Similar processing is performable between the terminal 1a or 1c and the WWW server 2.

As shown in FIGS. 9 and 10, in the above embodiment, the home page was created by performing the process in a dialog manner between any particular one of the terminal 1a–1c and the WWW server 2. However, the present invention is not limited to this particular case. For example, the WWW server 2 may collect preference data by an electronic mail between the WWW server 2 and one of the terminal 1a–1c to create a home page. Preference data described on a mark sheet may be read with an optical code reader to create a home page.

In the above embodiment, the template of the home page was provided for the type of each of the terminals 1a–1c and the user age group. In addition, the templates may be provided for various other types. For example, the templates may be provided for respective men and women. Alternatively, for example, a template about an underlying tone of a home page may be prepared in accordance with answer preference data to an inquiry item "favorite color" (preference data) of the preference inquiry data. In addition, the template may be changed depending on the number of times of updating the home page or the time of updating the home page.

In the above embodiment, a destination with which a home page is linked is predetermined and stored in the linked destination address table 27c. The address of the destination to be linked may be changed dynamically. For example, the home page may be linked with an address of a similarly created home page of a user who has the same interest as the user of the former home page.

In the above embodiment, when the WWW server 2 created the home page, the internal timer of the CPU 21 recorded the time when the home page was created. The WWW server 2 recognized the updated state of the home page by the time when the home page was created and when the internal timer recorded. However, the present invention is not limited to this particular case. For example, the WWW server 2 may determine the updated state of the home page with version information incremented each time the home page is updated. Alternatively, the WWW server 2 may recognize the updated state of the home page, using a time stamp.

In the above embodiment, when any particular one of the terminal 1a–1c requests the WWW server 2 to send a home page thereto, it sends the WWW server 2 information on the date and time when the home page was created. The WWW server 2 determines coincidence/non-coincidence of the home pages sent by the terminal and stored in the server, using the date and time when the home pages were created. Alternatively, the terminal may determine the coincidence/non-coincidence of the home pages. In this case, in response to the terminal's request to send the home page to the terminal, the WWW server 2 is required to send the terminal information on the date and time where the home page was created. When the dates and times when the home pages were created are not coincident, the terminal again requests the WWW server to send the terminal the appropriate home page.

In the above embodiment, when the home page has not been updated for more than one month, the WWW server 2 again inquired the user's preference and created a corresponding new home page. However, the present invention is not limited to this particular case. For example, the term of updating the home page may be changed depending on a user age group. Alternatively the home page may be updated not depending on a term beginning after the home page is updated, but a new home page may be created on a predetermined periodical date such as a fifteenth of an odd month.

In the above embodiment, when a terminal requests the WWW server 2 to create a home page, the WWW server 2 creates the home page and the stores in the data file 27 information on the home page and on the date and time where the home page was created. When the WWW server 2 sends no coincidence code to any particular one of the terminals 1a–1c which requested the WWW server 2 to send the home page to that terminal, the WWW server 2 sends the terminal the home page stored file data file 27. However, the present invention is not limited to this particular case.

For example, the WWW server 2 may store only the preference data in the data file 27 and create a home page based on the preference data and send it to the terminal, as requested. When a terminal different in type from the terminal which created the home page stored in the data file 27 (for example, a portable information terminal different from a personal computer which created a home page requests the WWW server to send the home page), the WWW server 2 may re-create the home page and send it to the terminal.

In the above embodiment, the terminal's home page created by the WWW server 2 was stored in the storage device 13 of the terminal. When any one of the terminals 1a–1c requests the WWW server 2 to send the home page to that terminal and when the home page has not been updated, the WWW server 2 sends a coincident code to the terminal. In this case, the terminal displays on its display device 14 the home page stored in the storage device 13. In this case, the terminal may perform similar processing on a home page created by another user.

What is claimed is:

1. A server providing a home page for a plurality of clients connected via a network, comprising:

personal information storage means for storing personal information on respective users of the plurality of clients;

inquiry data sending means, responsive to a request from any one of the plurality of clients, for sending inquiry data to the requesting client with respect to an idea of a user of the requesting client;

home page creating means, responsive to receiving answer data to the inquiry data, for reading from said personal information storage means personal information on the user of the requesting client, and for creating a home page peculiar to the user which reflects the user's idea and contains the personal information, based on the answer data and the read personal information and without requiring that said user have any special knowledge of the home page creation process; and home page storage means for storing the home page created by said home page creating means so as to be accessible freely by each of the plurality of clients via the network.

2. The server according to claim 1, wherein said inquiry data sending means reads from said personal information storage means personal information on the user of the requesting client, produces inquiry data peculiar to the user based on the read personal information, and sends the inquiry data to the requesting client.

3. The server according to claim 1, wherein said home page creating means creates a home page peculiar to the user of the requesting client which contains a name of the user.

4. The server according to claim 1, wherein said home page creating means creates a home page peculiar to the user of the requesting client which contains a face of the user.

5. A server providing a home page for plurality of clients connected via a network, comprising:

template storage means for storing a plurality of templates for creating home pages corresponding to respective types of the plurality of clients;

home page creating means for reading a template corresponding to a type of a requesting client from said template storage means based on type information received from the requesting client, and for creating a home page based on the template and without requiring that said user have any special knowledge of the template creation process; and home page storage means for storing the home page created by said home page creating means so as to be freely accessible by the plurality of clients via the network.

6. The server according to claim 5, wherein said home page creating means creates a home page whose display format is dependent on the type of the requesting client.

7. A server for providing a home page for a plurality of clients connected via a network, comprising:

storage means for storing a home page and update information indicating an update status of the home page;

comparing means, responsive to a client's access, for comparing update information on a home page stored in the client and the update information on the home page stored in said storage means; and sending means, responsive to said comparing means indicating that the two update information coincide, for displaying to the client the home page stored in the client, and responsive to said comparing means indicating that the two update information do not coincide, for sending the client the home page and update information stored in said storage means and for displaying the home page and update information to the client.

8. A recording medium having stored thereon a computer readable program for enabling a computer to operate as a server for providing a home page for a plurality of clients connected via a network, said program comprising:

personal information storage code means for enabling the computer to store personal information on respective users of the plurality of clients;

inquiry data sending code means for enabling the computer to, responsive to a request from any of the plurality of clients, send inquiry data to the requesting client with respect to an idea of a user of the requesting client;

home page creating code means for enabling the computer to, responsive to receiving answer data to the inquiry data, read personal information on the user of the requesting client from said stored personal information, and create a home page peculiar to the user which reflects the user's idea and contains the personal information, based on the answer data and the read personal information and without requiring that said user have any special knowledge of the home page creation process; and home page storage code means for enabling the computer to store the created home page so as to be accessible freely by each of the plurality of clients via the network.

9. The recording medium according to claim 8, wherein said inquiry data sending code means enables the computer to read personal information on the user of the requesting client from the stored personal information, produce inquiry data peculiar to the user based on the read personal information, and send the inquiry data to the requesting client.

10. The recording medium according to claim 8, wherein said home page creating code means enables the computer to create a home page peculiar to the user of the requesting client which contains a name of the user.

11. The recording medium according to claim 8, wherein said home page creating code means enables the computer to create a home page peculiar to the user of the requesting client which contains a face of the user.

12. A recording medium having stored thereon a computer readable program for enabling a computer to operate as a server for providing a home page for plurality of clients connected via a network, said program comprising:

template storage code means for enabling the computer to store a plurality of templates for creating home pages corresponding to respective types of the plurality of clients;

home page creating code means for enabling the computer to retrieve a stored template corresponding to a type of a requesting client based on type information received from the requesting client, and create a home page based on the retrieved template and without requiring that said user have any special knowledge of the template creation process; and home page storage code means for enabling the computer to store the created home page so as to be freely accessible by the plurality of clients via the network.

13. The recording medium according to claim 12, wherein said home page creating code means enables the computer to create a home page whose display format is dependent on the type of the requesting client.

14. A method of providing a home page for a plurality of clients connected via a network comprising:

storing personal information on respective users of the plurality of clients;

sending, responsive to a request from any one of the plurality of clients, inquiry data to the requesting client with respect to an idea of a user of the requesting client;

reading from the stored personal information, responsive to receiving answer data to the inquiry data, personal information on the user of the requesting client, and creating a home page peculiar to the user which reflects the user's idea and contains the personal information and without requiring that said user have any special knowledge of the home page creation process; based on the answer data and the read personal information; and storing the created home page so as to be accessible freely by each of the plurality of clients via the network.

15. The method according to claim 14, wherein the inquiry data sent to the requesting client is peculiar to the user and is produced based on the read personal information.

16. The method according to claim 14, wherein the created home page is peculiar to the user of the requesting client and contains a name of the user.

17. The method according to claim 14, wherein the created home page is peculiar to the user of the requesting client and contains a face of the user.

18. A method of providing a home page for a plurality of clients connected via a network comprising:

storing a plurality of templates for creating home pages corresponding to respective types of the plurality of clients;

retrieving a stored template corresponding to a type of a requesting client based type information received from the requesting client, and creating a home page based on the retrieved template and without requiring that said user have any special knowledge of the template creation process; and storing the created home page so as to be freely accessible by the plurality of clients via the network.

19. The method according to claim 18, wherein the home page is created to have a display format which is dependent on the type of the requesting client.

* * * * *